May 1, 1956 B. O. KAPPELMANN 2,743,832
PICKUP TRAILER DISCHARGE CONVEYOR
Filed Dec. 27, 1954
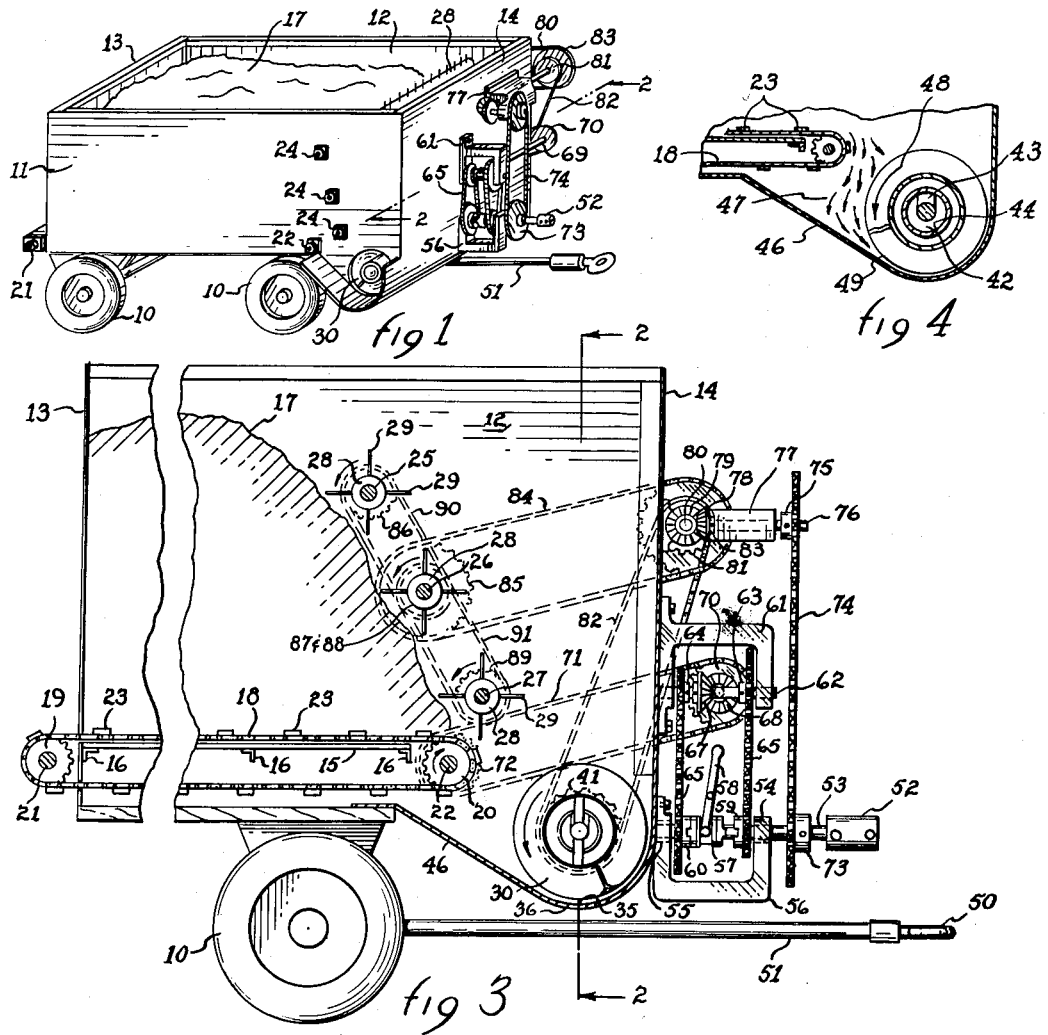
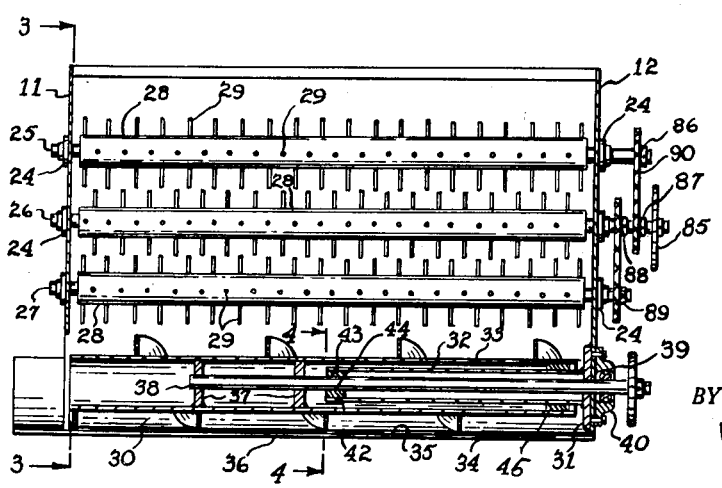
INVENTOR.
BENJAMIN O. KAPPELMANN
BY
Willard S. Grant
ATTORNEY

United States Patent Office 2,743,832
Patented May 1, 1956

2,743,832

PICKUP TRAILER DISCHARGE CONVEYOR

Benjamin Oscar Kappelmann, Phoenix, Ariz.

Application December 27, 1954, Serial No. 477,654

1 Claim. (Cl. 214—519)

This invention pertains to improvements in discharge conveyor mechanism for pickup trailers such as pickup trailers used for farm silage or the like.

One of the objects of this invention is to provide an improved discharge conveyor for a pickup trailer for farm silage and the like which is highly efficient and trouble-free in operation and is not subject to the peculiarities and variations in the field materials deposited in the trailer for its efficient discharge of the same in feeding troughs and the like.

Still another object of this invention is to provide an improved screw conveyor for a pickup trailer adapted to receive materials dumped in this trailer from a scraper deck in such a manner as to efficiently and effectively discharge the material from the trailer in a highly efficient and trouble-free manner.

Still another object of this invention is to provide an improved pickup trailer discharge mechanism including a screw conveyor rotatable on a substantially horizontal transverse axis on the trailer and which mounting includes means to permit transverse vertical shifting of the outer end of the screw conveyor to prevent jamming and clogging of the screw device in unloading all types of material from the trailer.

It is also an object of this invention to provide an improved container structure for a screw conveyor for discharging materials from a pickup trailer having an open discharge area relative to the screw to fully receive all materials discharged from the load-containing portion of the pickup trailer.

Further features and advantages of this invention will appear from a detailed description of the drawings in which:

Fig. 1 is a general perspective view showing a pickup trailer incorporating the features of a discharge conveyor covered by this invention.

Fig. 2 is an enlarged section on the line 2—2 of Figs. 1 and 3.

Fig. 3 is a fragmentary sectional view on the line 3—3 of Fig. 2.

Fig. 4 is an enlarged fragmentary section on the line 4—4 of Fig. 2.

As illustrative of one embodiment of this invention there is shown a pickup trailer having suitable ground wheels 10 which are appropriately secured to the frame of the trailer which includes the sides 11 and 12 and the ends 13 and 14. A bottom 15 is supported on suitable cross members 16 in the frame to carry the load 17 placed in the pickup trailer. The usual scraper bar arrangement comprising the endless chains 18 operating over suitable sprockets 19 and 20 on the respective shafts 21 and 22 suitably journaled in the frame of the machine has the scraper bars 23 attached thereto which operate forwardly over the floor 15 to continually bring the load 17 toward the front of the trailer.

Journaled in suitable bearings 24 mounted on the sides 11 and 12 of the trailer are the pick shafts 25, 26 and 27 having the pick cylinders 28 with the picks 29 fixed therein for engaging and moving the load 17 forwardly and downwardly of the trailer so that the material is discharged between the shaft 22 carrying the scraper chains and the lower pick cylinder on the shaft 27 from where it is deposited on to the transversely disposed screw conveyor indicated generally at 30.

The discharge screw conveyor comprises a plate 31 securely fixed to the side 12 of the trailer and to which is securely welded the support tube 32 which extends substantially halfway transversely across the width of the trailer. The screw supporting tube 33 of the conveyor 30 has rigidly fixed to its outer periphery the usual screw blade 34 which nicely operates in and closely coincides with the arcuate portion 35 of the trough 36 surrounding the screw conveyor. To the inside of the screw supporting tube are welded radially disposed pins 37 which in turn are welded or otherwise secured at their inner ends to the drive shaft 38. The outer end of the shaft 38 is journaled in a suitable universally mounted bearing 39 in the pillow block casting 40 secured to the side 12 of the trailer and has a suitable drive sprocket 41 fixed to the outer end of the shaft 38. At the inner end of the support tube 32 is fixed a U-shaped bearing bushing 42 having a radially cutaway portion 43 to fit the diameter of the shaft 38, the bearing having the arcuate bearing portion 44 at the lower end of the cutaway portion 43, the purpose of this construction being to permit vertical radial shifting of the shaft 38 and the conveyor screw 30. A bearing bushing 45 is also fixed on the support tube 32 closely adjacent to the plate 31 carrying the support tube 32 which acts as a steady bearing riding on the inside of the screw supporting tube 33. Sufficient clearance is provided between the bearing bushing 45 and the inside bore of the tube 33 to enable the aforementioned radial vertical shifting of the screw 30.

The rear portion of the arcuate trough 36 is provided with an upwardly sloping flat portion 46 which is adapted to receive the material discharged by the scraper bars 23 and the picks 29 as indicated by the arrows 47 as best shown in Fig. 4. By this arrangement a sidewise conveyance or presentation of the material to the conveyor screw 30 is effected. Material is constantly sliding down the surface 46 aided in addition to the direction of rotation 48 of the conveyor screw as best shown in Fig. 4 to provide a constant supply of material to the screw. The angularly disposed flat portion 46 of the trough 36 acts as a secondary minor supply hopper which can adjust its flow in accordance with the capabilities of the discharge of the material by the screw conveyor 30. In addition, in the event too thick a batch of material or obstruction should be fed into the screw conveyor at the point 49, the entire screw conveyor may adjust itself upwardly slightly due to the slotted portion 43 in the bearing 42 just described so as to relieve itself and allow it to accommodate its condition to the excessive load or jammed discharge and thus avoid any conjection or final stopping or damage to the feed mechanism. Further, it gives the screw a chance to clear itself and clean itself of obstruction without wedging the material tightly in against the trough 36 as in more conventional nonaxially shiftable discharge screw conveyor mechanism.

The trailer may be connected to the usual tractor by a suitable hitch 50 on the tongue 51 and power for driving the above described mechanism may be derived from the usual power takeoff of the tractor connected to the input coupling 52 which is fixed to the input shaft 53 suitably journaled in bearings 54 and 55 in the support casting 56. Fixed to the shaft is the shiftable clutch member 57 operable by a suitable shifter lever 58. The smaller sprocket 59 and the larger sprocket 60 are journaled on the input shaft 53 but may be alternately connected to be driven from the shaft 53 by appropriately manipulating the lever 58. On another support casting 61 fixed to the front panel 14 of the trailer is the shaft 62 to which are fixed the larger sprocket 63 and the smaller sprocket 64. The sprocket 64 is connected to the sprocket 60 by suitable chain 65 while sprocket 63 is connected to the sprocket 59 by suitable chain 65. Power is taken off from the shaft 62 through the bevel gear 67 fixed thereto which in turn drives a bevel gear 68 fixed on a suitable shaft 69 on the outer end of which is fixed a sprocket 70 over which operates the drive chain 71 in turn operating over a sprocket 72 fixed to the shaft 22 of the floor scraper. Thus, by shifting the clutch spool 57 by the lever 58 a slower high speed drive to meet the character of the materials in the load 17 may be effected for the floor scrapers for bringing the material forwardly of the trailer to the pick cylinders 28 and for discharge into the screw conveyor as described.

The drive for the screw conveyor 30 is provided by the sprocket 73 fixed on the input shaft 53 which actuates the drive chain 74 operating over a suitable sprocket 75 fixed to the shaft 76 appropriately journaled on the bracket 77 on the front panel 14 of the trailer. The bevel gear 78 fixed on the shaft 76 in turn drives a bevel gear 79 fixed on the shaft 80 suitably journaled in the support bracket 77 on the front panel 14 of the trailer. A sprocket 81 fixed on the shaft 80 drives a chain 82 which in turn operates over the sprocket 41 fixed to the drive shaft 38 for rotating the screw conveyor 30 as described. Also, a second sprocket 83 fixed on the shaft 80 drives a chain 84 which in turn operates over the sprocket 85 fixed on the shaft 26. A series of sprockets 86, 87, 88 and 89 on the respective pick shafts 25, 26 and 27 are interconnected by suitable chains 89 and 90 so as to provide a suitable drive for the pick shafts and pick cylinders 28.

While the apparatus herein disclosed and described constitutes a preferred form of the invention, it is also to be understood that the apparatus is capable of mechanical alteration without departing from the spirit of the invention and that such mechanical arrangement and commercial adaptation as fall within the scope of the appendent claim are intended to be included herein.

Having thus fully set forth and described this invention what is claimed and desired to be obtained by United States Letters Patent is:

In a pickup trailer having a front panel and sides connected thereto, a transverse discharge trough mounted adjacent the lower edge of said front panel having an arcuate portion and a rearwardly and upwardly sloping portion to receive discharge from the floor of said trailer, a screw conveyor mounted in said trough including a support tube fixed to one of said sides and projecting toward the discharge end of said trough to an intermediate position therein, a drive shaft journaled in a self-aligning bearing carried on one of said sides, a first bearing supported in the outer end of said support tube adapted to rotatably engage an intermediate portion of said drive shaft including a cut-away portion to allow limited vertical radial shifting of said shaft, a screw support tube rigidly secured to said drive shaft adjacent to said first bearing, a second bearing located between the outside of said support tube and said screw support tube adjacent said one of said sides, a screw blade fixed on said screw support tube having a periphery closely conforming to said trough when said drive shaft is in normal downward position in said first bearing, and means for applying driving power to the outer end of said drive shaft adjacent said self-aligning bearing.

References Cited in the file of this patent
UNITED STATES PATENTS

| | | |
|---|---|---|
| 1,075,779 | Gerber | Oct. 14, 1913 |
| 2,060,569 | Greenlaw | Nov. 10, 1936 |
| 2,116,807 | Thrall | May 10, 1938 |
| 2,224,789 | Kurtz et al. | Dec. 10, 1940 |
| 2,600,008 | Ludeking | June 10, 1952 |
| 2,601,618 | Kringle | June 24, 1952 |
| 2,676,002 | Wolfe | Apr. 20, 1954 |